May 2, 1950 W. B. PHILLIPS 2,506,103
CALCULATING DEVICE
Filed March 24, 1945 2 Sheets-Sheet 1
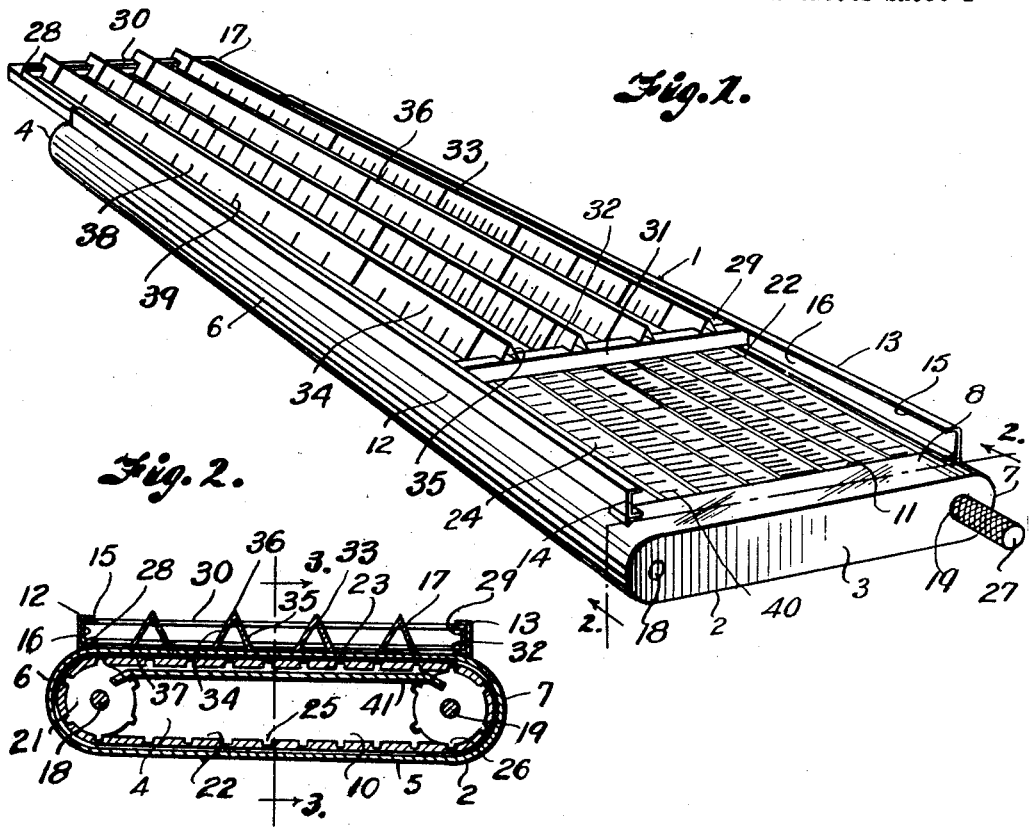
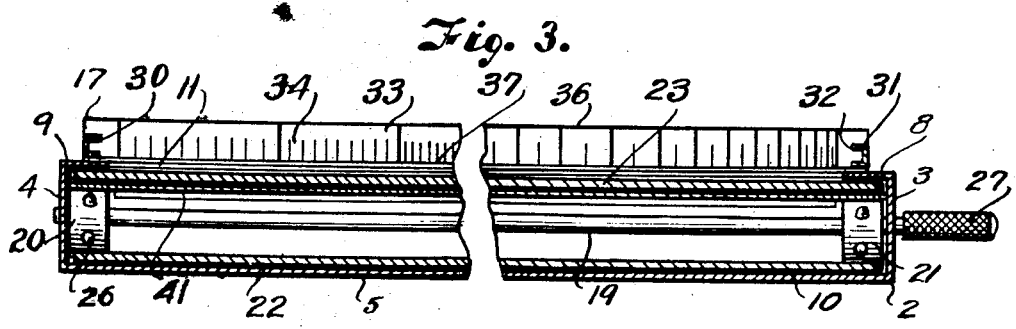
Inventor
Walter B. Phillips.
By Fishburn & Mullendore
Attorneys May 2, 1950     W. B. PHILLIPS     2,506,103
CALCULATING DEVICE Filed March 24, 1945     2 Sheets-Sheet 2

Inventor
Walter B. Phillips
By Fishburn & Mullendore
Attorneys

Patented May 2, 1950

2,506,103

UNITED STATES PATENT OFFICE 2,506,103

CALCULATING DEVICE

Walter B. Phillips, Kansas City, Mo., assignor of one-half to Western Blue Print Company, Kansas City, Mo., a corporation of Missouri Application March 24, 1945, Serial No. 584,669

8 Claims. (Cl. 235—70)

This invention relates to calculating devices which include a scale element relatively movable to another scale element, the scale elements being ruled in consecutive divisions spaced in proportion to the logarithm of a series of numbers.

In order to give more than two places accurately, the divisions should have relatively wide spacing and to keep the dimensions of such a device within reasonable length limits, the scales have been divided into strips and the strips arranged longitudinally about the surface of a cylinder. While such devices, known as Thacher calculators give from four to five places with accuracy, they are extremely bulky and cannot be conveniently carried from one place to another.

It is, therefore, the principal object of the present invention to provide a calculator which will give at least three places accurately and which is of simple and compact construction so that it may be readily and conveniently carried by the user in somewhat the same manner of an ordinary slide rule that can give only two places accurately.

Further objects of the invention are to provide a calculator device of the grid type wherein the registering points of the graduations on the respective scale members are substantially in common plane so as to avoid errors resulting in reading of the scales from angular directions or in refraction of light rays where it is necessary to register the graduations of the respective scales through a transparent material.

In accomplishing these and other objects of the invention, I have provided improved structure, the preferred forms of which are illustrated in the accompanying drawings wherein:

Fig. 1 is a perspective view of a calculating device constructed in accordance with the present invention.

Fig. 2 is a cross section through the calculating device on the line 2—2 of Fig. 1.

Fig. 3 is a longitudinal section on the line 3—3 of Fig. 2.

Figure 4:
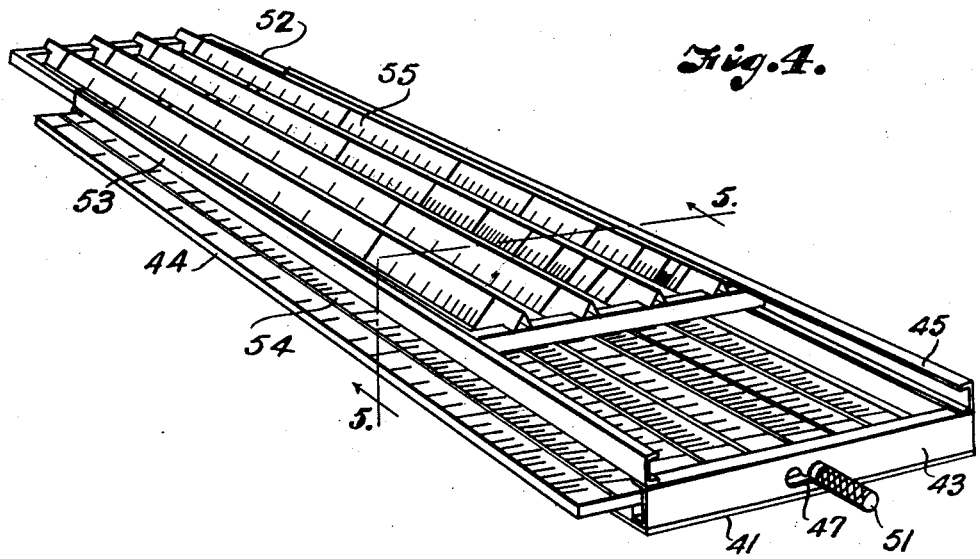
Fig. 4 is a perspective view of a modified form of the invention.

Referring more in detail to the drawings:

1 designates a calculating device embodying the features of the present invention and which includes a frame element 2 including ends 3 and 4 connected by a plate portion 5 having upwardly rounding sides 6 and 7 cooperating with inturned flange-like portions 8 and 9 on the ends 3 and 4 to form a substantially rectangular compartment 10 having an open top 11. Extending longitudinally of the terminal edges of the sides 6 and 7 are guide rails 12 and 13 having their ends suitably anchored to the ends of the flange portions 8 and 9 whereby the guides are retained in fixed spaced relation. In the form illustrated, the guides comprise substantially channel-shaped members having webs 14 and inwardly extending flanges 15 to form facing guide grooves 16 for mounting a grid-like scale element 17 later described.

Journaled within the ends 3 and 4 of the frame substantially coaxial with the axis of the curved sides 6 and 7 are shafts 18 and 19, each carrying sprockets 20 and 21 at the respective ends thereof. The sprockets mount an endless belt 22 extending therearound and having an upper run 23 substantially registering with the plane of the opening 11 in the frame 2. The belt is formed of a flexible material preferably a pliable plastic of a type having a minimum of expansion and contraction and which is moisture-proof and corrosion resistant. The belt is also of a material adapted to carry a plurality of scales 24 extending transversely thereof and parallel with the guide rails 12 and 13. The scales are spaced apart in accordance with the spacing of grid bars on the grid element 17 previously mentioned. Each scale on the belt forms a section of a continuous logarithm scale.

The scales are successively brought into view through the opening 11 by moving the belt. In order to effect movement of the belt, the side edges thereof are provided with a series of uniformly spaced perforations 25 adapted to engage pin-like teeth 26 on the sprocket and one of the sprocket shafts extends through the bearing opening in one of the end members to mount a knurled stem 27 that is adapted to be gripped between the thumb and fingers and rotated in either direction.

The grid-like element 17 includes a rectangular frame having longitudinal side rails 28 and 29 slidably positioned within the guide grooves 16 of the guide rails 12 and 13 and which are connected at their ends by cross rails 30 and 31 which are preferably of channel cross section and arranged with the flanges 32 thereof extending inwardly in facing relation as best shown in Figs. 2 and 3.

The frame is freely slidable across the opening 11 and substantially conforms to the length thereof to carry a plurality of spaced scale bars 33, The scale bars 33 have wings 34 and 35 diverging from a ridge 36 in the direction of the upper run of the belt and which have their edges 37 terminating closely adjacent the upper face thereof. The outer surfaces of the wings on the respective bars each have a section 38 of a continuous logarithmic scale corresponding to the scales 24 on the belt. The graduations 39 of the scales 38 register with the graduations 40 on the scales 24 when the grid-like frame is in registry with the opening 11 of the frame 2.

The upper run of the belt may operate over a table-like support 41 carried by the ends 3 and 4 of the frame 2.

The longitudinal bars of the grid element 17 have the ends thereof connected to the cross bars of the grid frame in any suitable manner such as soldering or the like so that the bars are spaced in corresponding relation with the scale strips on the belt.

It is thus obvious that the reading points of the graduations on the scale bars substantially contact with the graduations on the scales of the belt whereby the grid-like scale and belt may be accurately adjusted with respect to each other for making a calculation and for reading the result thereof. The under run of the belt, or that portion not used by the above-mentioned scales may carry auxiliary scales such as cube and square root of numbers.

In using the device constructed and assembled as described, the desired scale section on the belt is moved into position with a related scale on one of the longitudinal bars of the grid element. This is effected by rotating the knurled stem 27 in the desired direction. A predetermined graduation on the related bar of the grid is readily positioned over a graduation on the selected scale of the belt by shifting the grid frame 17 laterally along the guide rails 12 and 13 so that a result may be readily determined by noting graduations on one of the other scale strips of the belt relative to graduations on a related scale of one of the other scale bars substantially in the manner of a Thacher calculator.

Figure 5:
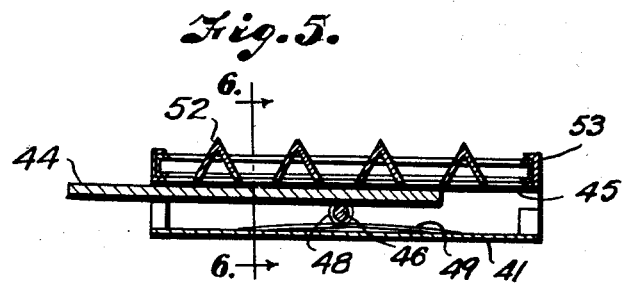
Fig. 5 is a cross section on the line 5—5 of Fig. 4.
Figure 6:
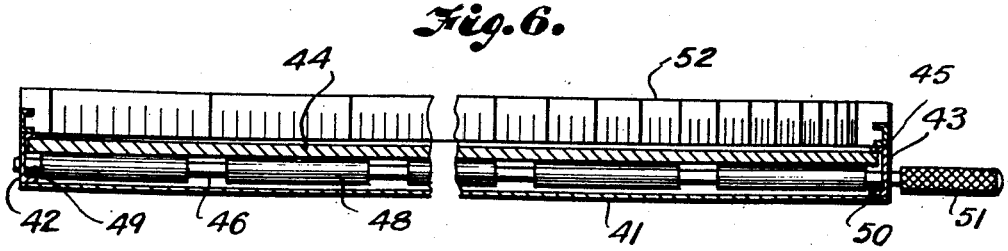
Fig. 6 is a longitudinal section on the line 6—6 of Fig. 5.

In the form of the invention shown in Figs. 4, 5, and 6, the fixed frame includes a base plate 41 having parallel channel-like guide rails 42 and 43 fixed to the ends thereof for slidably guiding a slide element 44 that has its upper face supported in sliding contact with the under face of the upper flanges 45 of the guide rails 42 and 43, the slide being supported in position on a shaft 46 journaled at its respective ends in bearing openings 47 formed in the web portions of the respective guide rails 42 and 43 at points substantially midway of the lengths thereof as best shown in Fig. 4.

In order to reciprocate the slide through rotation of the shaft, the shaft is preferably provided with a plurality of friction rollers 48 that are retained in yielding contact with the underface of the slide by arch-shaped leaf springs 49 and 50 having one of their ends fixed to the lower flanges of the guide rails and their other ends freely bearing thereon whereby resiliency in the arch portion of the springs retains the friction rollers in contact with the slide element of the calculator.

In order to rotate the shaft, one end thereof projects to mount a knurled stem 51 corresponding to the actuating stem for the belt in the preferred form of the invention.

The grid element 52 of the calculator in this form of the invention corresponds with the grid element 17 in the preferred form and is longitudinally slidable in channel-shaped guides 53 fixed at the ends to the guide members 42 and 43 previously described. The upper face of the slide 44 has a series of spaced scales 54 corresponding to the scales on the belt and the sides of the bars of the grid element have co-related scales 55 in the same manner as the scales on the belt and grid element on the calculator previously described.

In operating the modified form of the invention, the scales on the slide 44 are adjusted by reciprocating the slide and the guide members incidental to rotation of the stem 51. The grid-like element is adjusted relative to the slide by moving the grid longitudinally of the guide rails 53. The upper surface of the slide which carries the graduations of the scales is supported in substantially the plane of the terminal edges of the diverging wings forming the guide bars so that the reading points of the graduations on the respective scales are readily and accurately noted.

From the foregoing it is obvious that I have provided a calculator structure having at least three places accurately and may be read with ease inherent in the Thacher-type of calculator. It is also apparent that my improved scale is of simple and compact construction and may be readily manipulated and carried in a convenient manner.

What I claim and desire to secure by Letters Patent is:

1. A calculating device of the character described including an open frame having transverse pairs of longitudinal guides on opposite sides thereof, a grid scale element composed of spaced parallel bars slidably supported by one pair of guides, and a scale element slidable in the other pair of guides immediately adjacent the grid bars and having a substantially flat planar surface provided with graduations corresponding to those on said bars of the grid scale.

2. A calculating device of the character described including a frame having longitudinal guides on opposite sides thereof, a grid scale element slidably supported by the guides and composed of spaced bars extending parallel with said guides, a shaft rotatable in the frame, and a substantially planular scale element having movable support on the frame directly under the grid scale and having connection with said shaft.

3. A calculating device of the character described including a frame, an endless belt, means mounting the endless belt on the frame with a run thereof movable in a plane, a grid scale element including a plurality of spaced parallel bars carrying scale markings, and means slidably mounting the grid scale element for movement on the frame with the bars extending transversely over the run of said belt.

4. A calculating device of the character described including a frame, spaced shafts journaled in the frame, belt-supporting wheels on the shafts, an endless belt operating over the wheels and having a run movable in a plane, a grid scale element including a plurality of spaced parallel bars carrying scale markings, and means slidably mounting the grid scale element for movement on the frame with the bars extending transversely over said run of the belt.

5. A calculating device of the character described including a frame, an endless belt, means mounting the endless belt on the frame with a run thereof moveable in a plane, a grid scale element, including a plurality of spaced bars each having diverging wings above and terminating substantially at said plane, means slidably mounting the grid scale element for movement on the frame transversely of the run of said belt, and cooperating graduations on the wings of the bars and said belt.

6. A calculating device of the character described including a support, a scale element slidably supported for movement in one direction on the support and having a plane graduated surface, another scale element including a plurality of laterally spaced grid bars having faces diverging in the direction of said plane and provided with graduations cooperating with the graduations on said surface carried by the supporting means and movable in a direction transversely of and immediately over the scale element having the plane graduated surface, said last-named scale element having graduations extending substantially to the plane of said surface.

7. A device of the character described including a support, a substantially flat grid-like member slidable on the support and having graduations, and a belt member having a substantially flat rim carried by the support for movement transversely in substantial contact with the grid and provided with graduations cooperating with the graduations on the grid.

8. A device of the character described including a frame, a substantially flat grid-like member slidable on the frame and having parallel bars extending longitudinally in the sliding direction of said member and provided with logarithmic scales, a belt member movable on the frame only in a transverse direction to the bars of the grid member and carrying a plurality of logarithmic scales in substantially the same plane as the scales on the grid member, and means for actuating the belt member so that the scales thereon may be manipulated into juxtaposition with the scales on the bars.

WALTER B. PHILLIPS.

REFERENCES CITED

The following references are of record in the file of this patent:

UNITED STATES PATENTS

| Number | Name | Date |
|---|---|---|
| 1,153,565 | Oberg | Oct. 19, 1915 |
| 1,157,526 | Gilson | Sept. 14, 1924 |
| 1,413,021 | Gibb | Apr. 18, 1922 |
| 1,484,176 | Haimes | Feb. 19, 1924 |
| 2,334,725 | Perkins | Nov. 23, 1943 |

FOREIGN PATENTS

| Number | Country | Date |
|---|---|---|
| 174,369 | Great Britain | Dec. 21, 1922 |
| 403,895 | Germany | Oct. 11, 1924 |